United States Patent [19]

Cardinal, Jr.

[11] 4,000,602
[45] Jan. 4, 1977

[54] VACUUM CONDUIT PICK-UP DEVICE WITH IMPROVED CONTROL
[76] Inventor: Daniel E. Cardinal, Jr., 1352 Estate Lane, Lake Forest, Ill. 60045
[22] Filed: Sept. 29, 1975
[21] Appl. No.: 617,517
[52] U.S. Cl. .............................. 56/328 R; 15/340
[51] Int. Cl.² ...................................... A01D 46/24
[58] Field of Search ............. 56/328 R, 12.9, 13.1, 56/13.2, 31; 15/340

[56] References Cited
UNITED STATES PATENTS
3,537,245  11/1970  Smith ............................ 56/328 R
3,913,307  10/1975  Cardinal, Jr. .................... 56/328 R Primary Examiner—J.N. Eskovitz
Attorney, Agent, or Firm—Andrus, Sceales, Starke & Sawall

[57] ABSTRACT

A flexible pick-up conduit is connected to a source of vacuum for picking up leaves and the like. The conduit is mounted to an assembly which includes at least three longitudinally expandable accordian-like tubular control members normally extending parallel to the conduit. Pressurized air flows through the control members, and the relative air flow therethrough is selectively variable, as by a proportioning valve, thereby causing the tilt angle of the conduit and its mouth to change. A momentarily actuatable piston functions through a valve control plate to increase or decrease the expansion of the control members so as to lengthen or shorten the conduit without changing its angular disposition.

6 Claims, 7 Drawing Figures

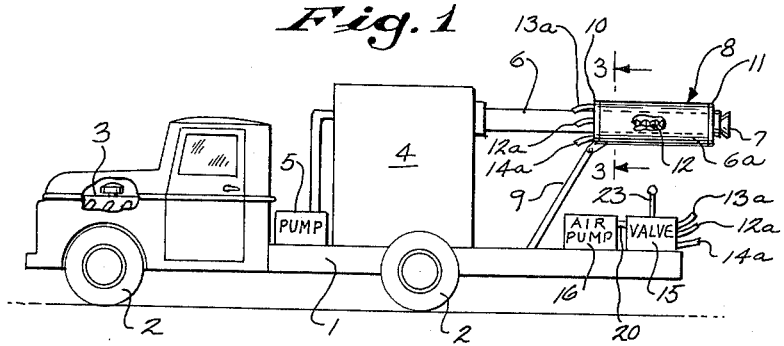
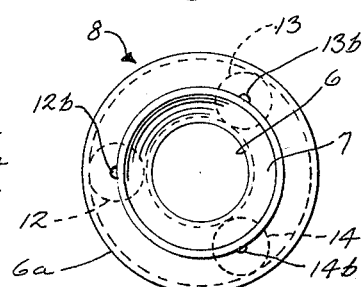
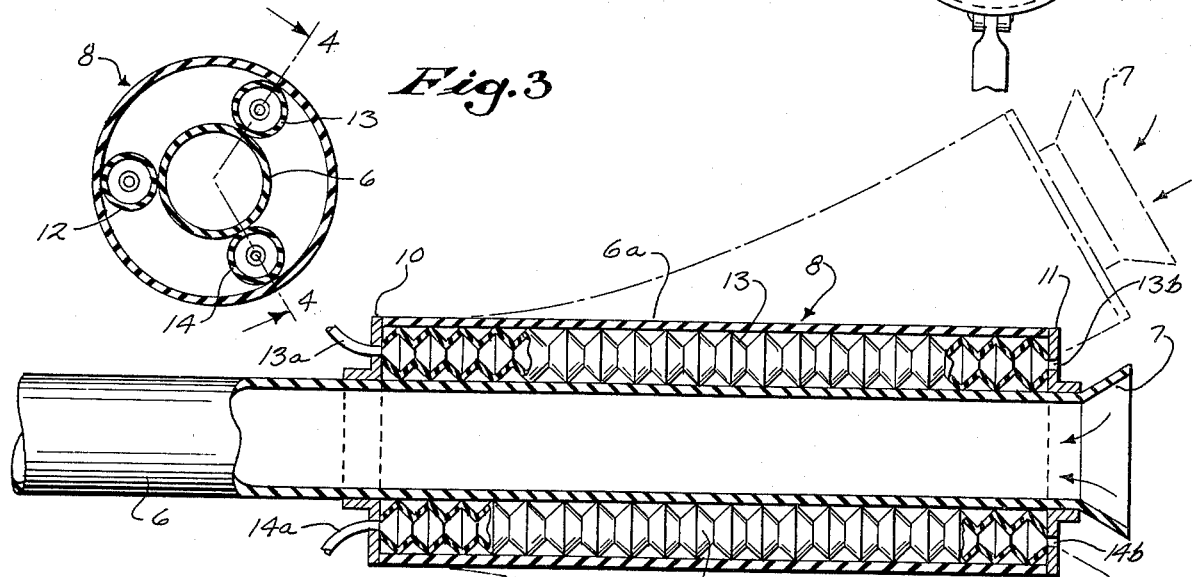
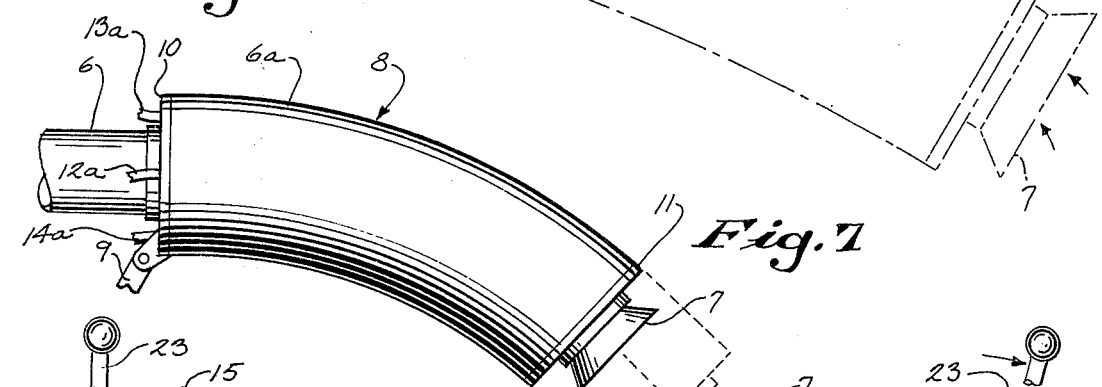
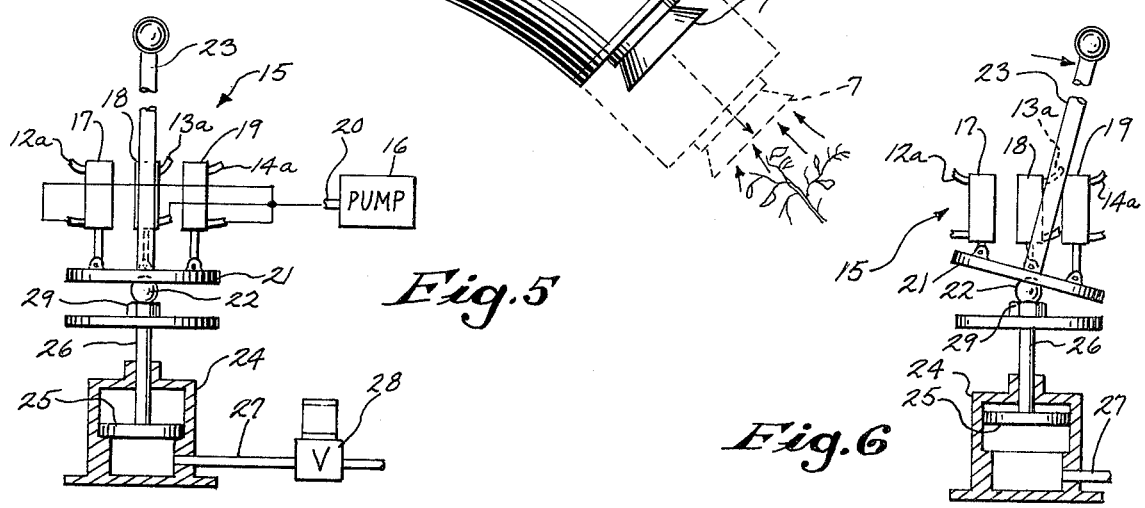

VACUUM CONDUIT PICK-UP DEVICE WITH IMPROVED CONTROL

BACKGROUND AND SUMMARY OF THE INVENTION

This invention relates to a vacuum conduit pick-up device with improved control, and constitutes an improvement on the invention disclosed in my co-pending patent application, Ser. No. 380,900 Filed July 19, 1973, now U.S. Pat. No. 3,913,307.

In that patent application, there is disclosed a device for picking up leaves, debris or other material for transfer to a container or the like. An elongated flexible conduit has an outer end mouth for engaging the materials and the conduit is vacuumized. A plurality of bellows are disposed along and generally parallel to the outer end portion of the conduit, and means are provided to expand the bellows at selective amounts to thereby support the conduit wall and hold it relatively rigid at a desired angle.

Under certain circumstances, it has been found desirable to extend or retract the conduit, while maintaining it at a desired angular disposition, such as for example in penetrating into the depths of a tree for branch cleaning; or for street cleaning.

The present invention accomplishes this purpose and is directed to an improvement whereby the air flowing through the bellows at selective amounts, which are usually different, is selectively increased or decreased an equal amount for each bellows to lengthen or shorten the conduit without changing its angular disposition. This is accomplished in the present embodiment by momentarily actuating a control cylinder which, through a valve control plate, equally varies the amount of air fed to each bellows.

BRIEF DESCRIPTION OF THE DRAWING

The accompanying drawing illustrates the best mode presently contemplated by the inventor for carrying out the invention.

In the drawing:

FIG. 1 is a schematic view of a vacuum conduit pick-up device constructed in accordance with the invention;

FIG. 2 is an end view of the pick-up assembly;

FIG. 3 is an enlarged transverse section of the pick-up assembly taken on line 3—3 of FIG. 1;

FIG. 4 is a longitudinal section taken on line 4—4 of FIG. 3 and showing the conduit in different angular positions;

FIG. 5 is a schematic showing of the air proportioning means and length adjustment means for the control member;

FIG. 6 is a view similar to FIG. 5 and showing shifting of the valve control plate; and FIG. 7 is a view similar to FIG. 4 and showing the angularly disposed conduit in initial and extended positions.

DESCRIPTION OF THE PREFERRED EMBODIMENT

As shown in FIG. 1 of the drawings, the device of the invention may be embodied in a debris pick-up device having a chassis or frame 1, ground engaging wheels 2 and an engine or other power source 3. A collection box 4 for debris is mounted to frame 1 and is connected to a vacuum pump 5. A pick-up and transfer conduit 6 is mounted with its inner end opening into box 4, and with its outer end wide mouth 7 formed to engage and remove material from trees or the like. Operation of pump 5 will cause an inward flow of air so that material will be sucked inwardly through conduit 6 into box 4.

Conduit 6 is flexible and elastic and may be of substantial length, and at least the outer end portion thereof forms part of a directional control assembly 8, as will be described in detail hereinafter. The weight of the conduit and assembly may be substantial, and is supported by means such as a boom 9 mounted to frame 1. As shown, boom 9 fixedly secures the inner end portion of assembly 8.

Assembly 8 comprises a pair of longitudinally spaced flanged annular inner and outer rings 10, 11 of metal or other relatively rigid material. Inner ring 10 is secured to boom 9, while ring 11 is movable. Conduit 6 passes through both rings and terminates in mouth 7 a short distance outwardly from outer ring 11. An outer flexible elastic tube 6a is disposed concentric with conduit 6 and extends between rings 10, 11.

Selectively controllable longitudinally expandable means are disposed along and parallel to the conduit wall to support the conduit wall in a relatively rigid position and to change the angle of disposition of the conduit. For this purpose, and in the embodiment shown, three flexible longitudinally expandable tubular accordian-like control members or bellows 12, 13, 14 are disposed between conduit 6 and tube 6a and extend between rings 10 and 11 and with their ends secured thereto in any suitable way. The inner ends of members 12, 13 and 14 are connected through suitable ports in inner ring 10 and air lines 12a, 13a and 14a to an air proportioning means 15. The outer ends of members 12, 13 and 14 are connected through restrictive air discharge or bleeder ports 12b, 13b and 14b in outer ring 11.

Pressurized air continuously flows through bellow 12–14 to pressurize and expand them from their normal generally retracted position, thereby supporting conduit 6. This is accomplished by providing air via a pump 16 to the air proportioning means 15. Pump 16 may be actuated by any suitable means, not shown.

As best shown in FIG. 5, air proportioning means 15 comprises three valves 17, 18 and 19 which are connected via a common line 20 to pump 16; and which are also connected to lines 12a, 13a and 14a respectively. Valves 17–19 are actuated to vary the relative air pressures within the bellows so they expand outwardly by different amounts, thereby causing conduit 6 to flexingly tilt as shown in FIG. 4. For this purpose, a disc-like control plate 21 is disposed in actuating engagement with valves 17–19 and is adjustably tiltable about a supporting ball 22. A manually actuatable handle 23 is mounted to plate 21, and shifting of the handle tilts the plate from a neutral position shown in full lines to vary the air flow through the valves and bellows.

In order to provide complete 360° rotational control of conduit 6, at least three bellows are required.

Bleeder ports 12b, 13b and 14b serve to assist in pressure build-up within the bellows.

In accordance with the invention, means are provided to vary the length of conduit 6 while retaining its angle of inclination as set by handle 23. For this purpose, a control cylinder 24 is disposed on the side of control plate 21 remote from valves 17–19. Cylinder 24 is provided with a piston 25, the rod 26 of which extends toward plate 21 and which provides a seat for ball 22. Piston 25 is disposed in cylinder 24 above an air line 27 which is connected between the cylinder and pump 16. Pressurized air passing through line 27 into cylinder 24 raises piston 25 and rod 26 to thereby raise control plate 21, as best shown in FIG. 6. All surface portions of plate 21 will be raised the same distance, no matter what tilted position the plate is in, so that valves 17–19 are actuated an equal amount simultaneously to thereby increase the air flow equally through bellows 12–14 to lengthen conduit 6 while retaining its angular position. See FIG. 7. Discharge of air from cylinder 24 reverses the action, but the angle will again remain stable, unless handle 23 is moved simultaneously.

It is considered desirable to provide a quick charge or discharge of air from cylinder 24. For this purpose, a push button poppet-type solenoid valve 28 of any well-known type is disposed in line 27. Selective actuation of the valve automatically and momentarily connects line 27 to the cylinder or drains pressurized air therefrom.

Since during operation of the device, it is essential that air flows through and pressurizes bellows 12–14 to keep them at least partially extended, valves 17–19 are kept open at least a minimum amount at all times. This may be accomplished by setting the height of control plate 21 at a minimum, such as by an adjusting nut 29 on the end portion of piston rod 26.

Various modes of carrying out the invention are contemplated as being within the scope of the following claims particularly pointing out and distinctly claiming the subject matter which is regarded as the invention.

I claim:

1. A pick-up device for leaves or other materials comprising, in combination:
   a. a frame,
   b. an elongated longitudinally expandable flexible conduit mounted on said frame and with said conduit having an outer end mouth portion for engaging said materials,
   c. means for vacuumizing said conduit so that the said materials will flow through said conduit from said mouth,
   d. a plurality of tubular flexible longitudinally expandable members disposed along and generally parallel to the outer end portion of said conduit,
   e. means to expand said plurality of members selectively different amounts to thereby flexingly tilt said conduit to a desired angle of disposition while supporting the conduit wall and holding it in relatively rigid position,
   f. and means to selectively vary the length of said tilted conduit without changing its angle of disposition.

2. The device of claim 1 in which said conduit length varying means comprises: selectively actuatable means to expand or retract each of said plurality of members an equal amount simultaneously at any given tilted position of said conduit.

3. The device of claim 1 in which:
   a. said member expanding means (e) comprises:
      1. a source of pressurized air,
      2. and adjustable proportioning valve means connected between said air source and said plurality of members,
   b. and said conduit length varying means comprises: means to actuate said proportioning valve means so that equal amounts of air are simultaneously provided to or drained from each of said plurality of members.

4. The device of claim 3 in which said proportioning valve actuating means is automatically actuated momentarily.

5. The device of claim 4 in which said proportioning valve actuating means includes a poppet valve to provide said momentary actuation.

6. The device of claim 3 which includes adjustable means to set said proportioning valve means at a minimum open amount.

* * * * *